(12) United States Patent
Ancora et al.

(10) Patent No.: US 8,938,203 B2
(45) Date of Patent: Jan. 20, 2015

(54) PROCESS FOR ACHIEVING SPUR MITIGATION IN AN INTEGRATED CIRCUIT INCLUDING A WIDE BAND RECEIVER

(75) Inventors: Andrea Ancora, Nice (FR); Dominique Brunel, Antibes (FR); Laurent Noel, Laval (CA)

(73) Assignee: ST-Ericsson SA, Plan-les-Ouates (CH)

( * ) Notice: Subject to any disclaimer, the term of this patent is extended or adjusted under 35 U.S.C. 154(b) by 149 days.

(21) Appl. No.: 13/574,950

(22) PCT Filed: Jan. 26, 2011

(86) PCT No.: PCT/EP2011/000348
§ 371 (c)(1),
(2), (4) Date: Nov. 8, 2012

(87) PCT Pub. No.: WO2011/092005
PCT Pub. Date: Aug. 4, 2011

(65) Prior Publication Data
US 2013/0196609 A1  Aug. 1, 2013

(30) Foreign Application Priority Data
Jan. 26, 2010  (EP) ..................... 10368009

(51) Int. Cl.
*H04B 1/44* (2006.01)
*H04B 1/10* (2006.01)
*H04B 15/04* (2006.01)

(52) U.S. Cl.
CPC ............... *H04B 1/44* (2013.01); *H04B 1/1036* (2013.01); *H04B 15/04* (2013.01); *H04B 2001/1063* (2013.01)
USPC .............. 455/78; 455/73; 455/501; 455/63.1; 455/296

(58) Field of Classification Search
CPC ..................... H04B 1/1036; H04B 2001/1063; H04B 1/44
USPC ......... 455/501, 63.1, 114.2, 296, 130, 73, 78, 455/306, 307
See application file for complete search history.

(56) References Cited

U.S. PATENT DOCUMENTS

2007/0042802 A1* 2/2007 Park et al. .................. 455/552.1
2008/0146184 A1* 6/2008 Dessert ........................ 455/310
2009/0023404 A1   1/2009 Leinonen et al.

FOREIGN PATENT DOCUMENTS

| EP | 0812069 | A2 | 12/1997 |
| WO | 0169803 | A1 | 9/2001 |
| WO | 02093807 | A1 | 11/2002 |
| WO | 2009075850 | A2 | 6/2009 |

* cited by examiner

*Primary Examiner* — Tuan Pham
(74) *Attorney, Agent, or Firm* — Coats & Bennett, PLLC

(57) ABSTRACT

A radio transceiver including—an antenna (201) switch having a control lead (226); —a RF and front end circuit (202) coupled to said antenna switch and operating in at least one 2G mode and at least one 3G mode; —a RF transceiver (209) coupled to said RF front end and operating in at least a first 2G and a second 3G mode; —a baseband (210) communicating with a set of peripherals and external devices; The radio transceiver is characterized by the fact that it includes: —control means (221) for controlling said antenna switch (201) in a isolated mode; —an programmable adaptive filter controlled by said control means for the purpose of introducing at least one notch for eliminating one corresponding spur. The radio transceiver preferably includes means (215) for performing, under control of said control means (221) a FFT computation for the purpose of elaborating a representation, in the time domain, of the different spurs and/or jammers spoiling the received signal when in isolated mode.

21 Claims, 13 Drawing Sheets

PROCESS FOR ACHIEVING SPUR MITIGATION IN AN INTEGRATED CIRCUIT INCLUDING A WIDE BAND RECEIVER

TECHNICAL FIELD

The invention relates to the field of wireless communications and more to particularly to a process for achieving spur mitigation in an integrated circuit including a wide band receiver.

BACKGROUND ART

Until recently, mobile wireless equipment used separate Integrated Circuits (ICs) for the Radio Frequency (RF) transceiver, the baseband (BB) processor and the Power Management Unit (PMU). With the growing success of FDD-WCDMA (3G) telecommunication standards, HSPA (acronym which covers HSDPA and HSUPA application) as part of FDD-WCDMA technology, which used to be a premium telecommunication feature targeting only high-end phones, must now be incorporated with limited extra cost to the previous 2.5 G generation of handsets, such as EGPRS devices. In this context, the approach taken by most IC vendors is that of a single chip, made up of either a single RF CMOS die, or multiple separate dies, which integrates into a single package all three previously listed ICs, namely, RF, BB and PMU into a single package.

FIG. 1 illustrates the general architecture of a multiple-band 2G/3G phone 100 which shows such an integration of a RF Front End circuit 110, a 2G/3G RF transceiver 120, a baseband 130, a PMU unit 140 and possibly DDR memory 150, being either external or internal.

FIG. 1 shows that RF Front-End circuit 110 supports quad band 2G (Band II, III, V, VIII EGPRS), triple band 3G (WCDMA I, II, III) which is typical of recent mobile phone architecture, the selection of the particular mode/band being performed by means of an antenna switch 111 which directs the signal to the appropriate set of front end filters 112. Conversely, antenna switch 101 directs the transmit signal generated by the appropriate 2G or 3G Power amplifiers, respectively 113 and 114, to the antenna.

2/3G transceiver 120 includes the conventional circuits required for achieving a 2G or 3G mobile communication, such as, in the receiving chain, low Noise amplifiers (LNA) 121, a Rx VCO Frequency synthesizer 122 with appropriate division circuits (represented by local divider LO Div), a circuit 123 achieving programmable Gain amplifier (PGA), Analog to digital converter (ADC) as well as DSP processing. On the transmitting chain, transceiver 120 includes a circuit 126 achieving PGA, Digital to Analog (OAC) conversion as well as DSP processing, a Tx VCO frequency synthesizer 125 associated with dividing circuits (LO Div), and conventional digitally controlled Gain amplifier 124. Transceiver 120 further includes appropriate timing circuits 126 as well as a RF-BB baseband interface 127 for interfacing the baseband 130. For the sake of clarity, the different control, data and clock signals which are represented in FIG. 1 (such as RFB-Bi_EN, RX data 1, RX data 2, TX data 1, SYSCLKEN, SYSCLK) are conventional and known to the skilled man and do not need any further discussion.

Similarly, baseband 130 achieves communication between the transceiver 120 (through interface 127) with different devices and peripherals, such as two cameras 160, two displays 170, a USB device 180 through appropriate data and control leads (including CLK clocks and Chip Select CSi) as well as external DDR memory.

It can be seen that the integration of those components in a single die clearly reduces the cost of manufacturing a handset since the telecom pipe of the mobile phone now only requires very few extra additional components to make a phone call: one or several Power Amplifier(s) (PA) and its associated front-end circuitry such as RF bandpass filters, duplexers, antenna switch etc.

While the single chip RF, BB, PMU presents a significant cost reduction of the entire mobile phone chipset, there are significant EMI problems to be considered in order to prevent the RF receiver as well as the RF transmitter chain from being polluted by digital BB and external memory bus noise, as well as associated clock spurs, and their multiple harmonics.

In such a context, the problem of the EMI interference introduced in the 3G receiver chain as being the victim shows to be highly critical.

Indeed, the 3G receiver suffers from multiple sources of aggression which can be sorted into two families:

Wideband noise source aggressors: falls into this category, noise generated by high speed data transfers between the single chip and its peripherals, such as camera 160, displays 170 but also, USB 180 and external memory interface 150, Narrowband spurs: falls into this category, either clock harmonics spurs, or pulsed clock source and their harmonics.

Aggressor's basic spectral properties are illustrated in FIGS. 2a-2c with respect to three typical situations:

FIG. 2a: continuous clock harmonics,

FIG. 2b: NRZ or RZ continuous data transmission,

FIG. 2c: pulsed clock source.

It should be noticed that since the victim is a 5 MHz wide carrier, it is not excluded that several spurs might fall within the victim's receiver carrier bandwidth.

The digital circuitry generates narrowband spurs which span over several hundred of MHz, which can couple into the Low Noise Amplifier (LNA) input pin(s) via electromagnetic coupling of the long bonding wires which can be modeled as radiating transmissions lines, acting in a fashion very similar to antennas.

FIG. 3 below shows the impact of the presence of a single Continuous Wave (CW) tone in-band jammer onto the receiver sensitivity of a typical 3G victim (NF=6.4 dB). There is plotted the NF User Equipment (UE) loss of receiver sensitivity vs. DPCH_Ec to Jammer power ratio (DPCH_Ec/J) for different UMTS cell geometry factors (Ior/Ioc power ratios). Fw=wanted signal carrier frequency, fj=jammer carrier frequency. The Minimum 3GPP conformance test requirements are shown with a vertical bar.

It should be noticed that such analysis is also applicable to the case of a single GMSK modulated carrier falling inside the receiver bandwidth (BW). For the sake of clarity the frequency offset dependent tolerance of the victim to the presence of such a jammer has not been represented in FIG. 3. Note that the geometry factor curve of −6 dB has been plotted here only for illustration purposes since the problem addressed by the present invention is impacting the receiver only when the downlink received modulated carrier power (Ior) is close to the UE reference sensitivity level. This situation corresponds to a UE located at cell edge. In conformance tests, the applicable set of curve is that where no additional AWGN noise is used (curve with Ior/Ioc=infinity).

The set of curves plotted in FIG. 3 shows how critical might be the introduction of additional clock spurs resulting from a digital activity in the most sensitive parts of the analog circuitry, and particularly when Ior gets close, or below the 3GPP conformance required sensitivity level.

Some prior art solutions are already known for limiting the effects of such additional spurs.

A first solution consists in protecting the victim by carefully designing the LNA and systematically using differential wires in order to make best benefit of the common mode rejection of such a differential architectures.

A second known solution is based on the use of sophisticated packages (eg. so-called flip chip package) for embodying the RF transceiver integrated circuit may reduce the coupling between the input wire of the LNA and the digital interface, which coupling generally increases with the frequency.

All those techniques clearly tend to increase the design and manufacturing costs of the transceiver IC.

In some situations, those techniques do not allow to avoid desensitization of the receiver in some circumstances. In particular, it has been shown that multiple integer harmonics of the reference clock used to transfer data over the external memory interface desensitize and/or degrade an RF receiver.

This is particularly shown in FIG. 4 for a 2G sensitivity measurement performed across all operating channels of the 900 MHz band, with an example of a reference clock of 26 MHz.

It can be clearly seen in FIG. 4 that severe reference sensitivity occurs at carrier frequency 936 MHz. This problem results from the fact that 936 MHz is a carrier frequency which is equal to the 36th multiple integer of the reference clock rate used by both DSP/CPU and external memory access. Therefore the 36th harmonic couples into the LNA input pins, and therefore degrades the 2G sensitivity.

The observations above show how critical the problem of EMI interference can be in a 3G receiver.

Therefore, there is a need of an effective technique allowing to protect the 3G receiver from the EMI pollution introduced by aggressors which are integrated in the same IC circuit.

Furthermore, there is a need for a technique also addresses the problem of the presence of such spurs in the case of a 3G receiver.

SUMMARY OF THE INVENTION

It is an object of the present invention to provide a mitigation technique which is applicable to limit the effects, in a 2G or 3G receivers, of the interference and spurs created by circuits located in the same integrated circuits.

It is another object of the present invention to provide a process for suppressing discrete narrowband clock spurs resulting from the several high order harmonics of either the reference clock, or the external memory access clock, or from the internal digital BB CPU and DSP clock rate, or even from the PMU DC/DC converters, and which might pollute and degrade the 3G receiver victim's sensitivity.

It is a further object of the invention to provide an enhanced despreading process within the digital BB circuit, which removes, wholly or partly, the clock spurs which fall within the passband bandwidth of the 3G wideband carrier.

It is still another object of the present invention to provide a dynamic, reprogrammable scheme in order to remove inband spurs which shows superior performances with respect to EMI requirements in case of multiple band communications.

These and other objects are achieved by a radio transceiver which includes an antenna switch having a control lead, a RF front end circuit coupled to said antenna switch and operating in different modes (2G and 3G) and different bands; a RF transceiver coupled to the RF front end circuit, and baseband communicating with different peripherals and external devices.

The radio transceiver is characterized by the fact that it includes:
  control means for controlling said antenna switch in a isolated mode;
  a programmable adaptive filter controlled by said control means for the purpose of introducing at least one notch for eliminating one corresponding spur.

In one particular embodiment, the radio transceiver includes means for performing, under control of a control unit, a FFT computation for the purpose of elaborating a representation, in the time domain, of the different spurs and/or jammers spoiling the received signal when in isolated mode.

The FFT representation is then used for deriving and identifying a set of spurs/jammers which are then used for controlling the programmable adaptive filter so as to generate a corresponding set of notches.

Preferably, the programmable adaptive filter is a Finite Impulse Response adaptive filter.

In one embodiment, the baseband and the RF transceiver are integrated in a same integrated circuit, either in a System on Chip or in a System or package.

Preferably, the baseband communicates with at least one camera, one display, one USB device and an external DDR memory.

In one embodiment, the radio transceiver includes a programmable adaptive filter comprising:
  a first digital mixer receiving the input signal and performing a frequency shifting of the latter so as to shift a first frequency (fs0) to DC;
  a High Pass Filter for suppressing the DC component;
  a second digital mixer for perform a new frequency shifting for the purpose of re-establishing the spectrum, at the exception of the removed first frequency (fs0).

More generally, the programmable adaptive filter may comprise, in cascade, numerous digital mixers, each performing a frequency shifting and two consecutive digital mixers being separated by a High Pass filter, so that multiple spurs can be simultaneously removed.

Preferably, the High Pass Filter is based on a Low Pass Filter (610) combined with a substractor.

The invention also achieves a process for suppressing spurs and/or jammers in a Wide band transceiver including an antenna switch having a control lead, a RF front end circuit coupled to said antenna switch, a RF transceiver coupled to said RF front end and a baseband communicating with a set of peripherals and external devices;

The RF receiver is arranged to be able to work in a 2G or 3G mode and the process involves the steps of:
  switching said antenna switch into a mode providing isolation between the antenna and said RF front end and said transceivers;
  performing a FFT computation for the purpose of identifying a set of spurs and/or jammers generated by EMI radiation;
  applying a digital programmable filter into said RF transceiver into order to generate a set of N notches corresponding to the N most significant spurs.

In one embodiment, for each identified spur or jammer, the process involves the steps of:
  computing a ratio of the power of said spur or jammer divided by the Received Signal Code Power (RSCP);
  comparing said ratio with respect to a given threshold;

in response to said comparison, programming said digital programmable filter for the purpose of generating a notch corresponding to said spur if said ratio is superior to said given threshold.

In one embodiment the digital programmable filter is a programmable notch digital filter such as, for instance, a Finite Impulse Response digital programmable filter.

Preferably, the process involves the step of determining whether the 3G communication is a rel99 communication mode or a HSDPA and, in response to said determination, applying a different time limit for completing said FFT computation.

In one embodiment, the process involves the use of a single FIR digital filter to implement the spur(s) removal scheme. This scheme provides one, or several notches depending on the number of aggressors spurs detected within the victim's receiver (RX) BW. This approach is thereby low cost in terms of die area, but presents slight loss of RX processing gain, and therefore a slight sensitivity performance degradation. Consequently, the scheme uses a programmable threshold upon which the activation of the FIR frequency notches are enabled or disabled. This threshold depends on:

The number of detected spurs falling in-band of the RX victim,

The signal to jammer power ratio (SJR),

The absolute power of the wanted carrier (Ior),

In another embodiment, the Fast Fourier Transform (FFT) provides:

the Detection of the number of jammer spurs falling in-band,

The power of each jammer spur,

The power of the wanted signal power is measured via standard means required by the 3GPP standard.

Each of these parameters are then used as input variables to either enable or disable the spur removal scheme to always deliver the optimum downlink system performance.

DESCRIPTION OF THE DRAWINGS

Other features of one or more embodiments of the invention will be best understood by reference to the following detailed description when read in conjunction with the accompanying drawings.

FIG. 7a more particularly shows the situation where the antenna switch in the "ON" position 1, for continuous WCDMA reception while FIG. 7b illustrates that of an antenna switch in the "OFF" position, letting the BB IC measure the aggressor's spurs coupling into the LNA input. The example shows the 82 harmonic of a 26 MHz clock

FIG. 9a particularly illustrates the situation of the RF IC I/Q spectral plot in presence with a cluster of spurs, one of which exceeds the decision threshold defined for the given Ior, and Ior/Ioc power ratio.

FIG. 9b illustrates the Amplitude response of the adequate digital FIR filter to remove only selected spur.

FIG. 9c illustrates the spectrum after spur removal. Fw denotes the wanted carrier frequency, fj denotes the jammer carrier frequency.

DESCRIPTION OF THE PREFERRED EMBODIMENT

There will now be described one embodiment of a narrow band spur mitigation technique applied to a 3G wideband receiver, which dynamically applies digital notch filtering on the received wanted carrier only under certain SJR and absolute received signal power, thereby improving the immunity to the narrowband spur harmonics generated by various interfaces, or power management unit blocks of the single chip IC.

The integration of a power management unit and a baseband communicating with external peripherals (camera(s), display(s), DDR memory etc. . . . ) will be considered as particular embodiment. Clearly, the integration is not limited to those elements and the spur mitigation process described below may be adapted to other types of components.

For the sake of clarity, the example of a band I FDD-WCDMA receiver victim and a 26 MHz clock harmonic aggressor will be considered, but the skilled man will straightforwardly adapt the teaching of the invention to not only other frequency bands of the WCDMA 3GPP standard, but also to any telecommunication standard which employs wideband (ie. with BW>200 kHz) modulated carriers, as well as to other reference clock frequency different from 26 MHz.

Figure 2A:
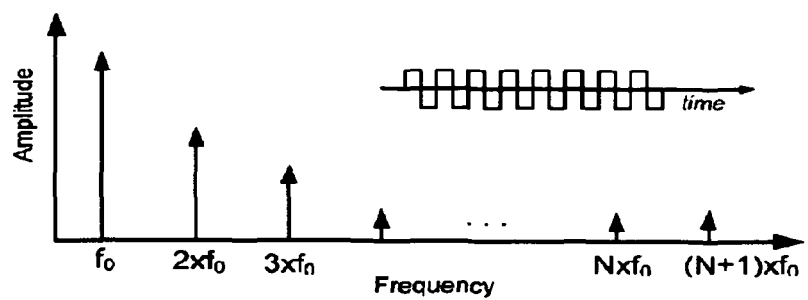
FIG. 2 illustrates the basic spectral properties of one typical aggressor.
Figure 2B:
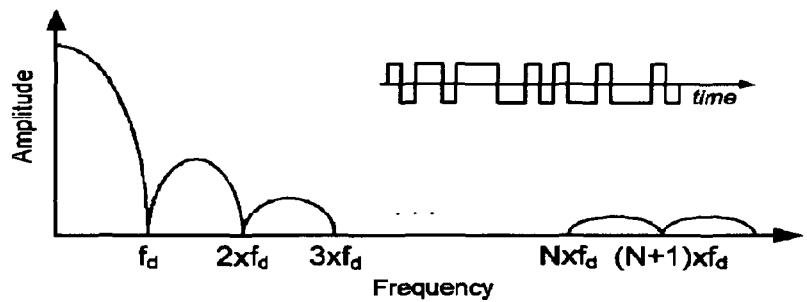
Figure 2C:
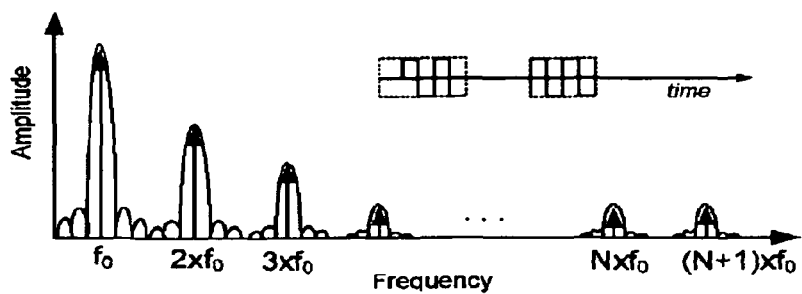
Figure 3:
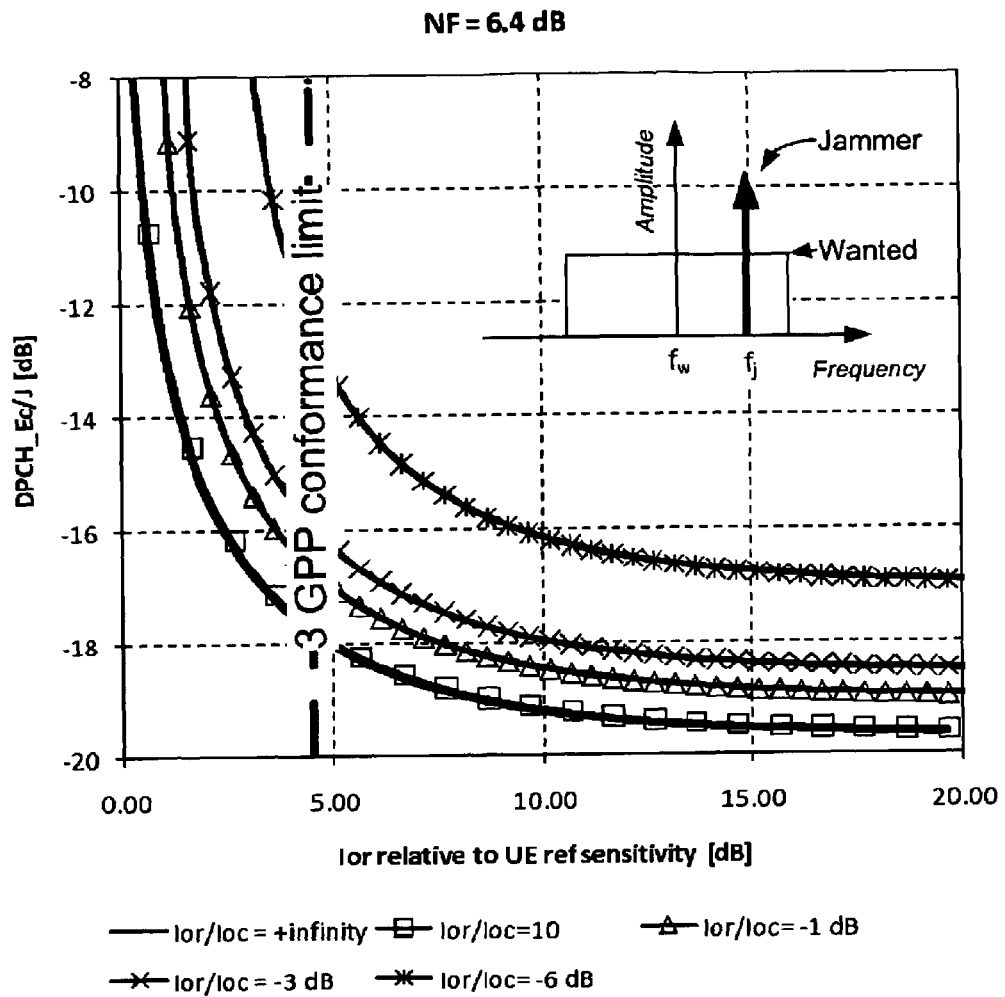
FIG. 3 illustrates the impact of the presence of a single CW tone in-band jammer onto the receiver sensitivity of a typical 3G victim (NF=6.4 dB)
Figure 4:
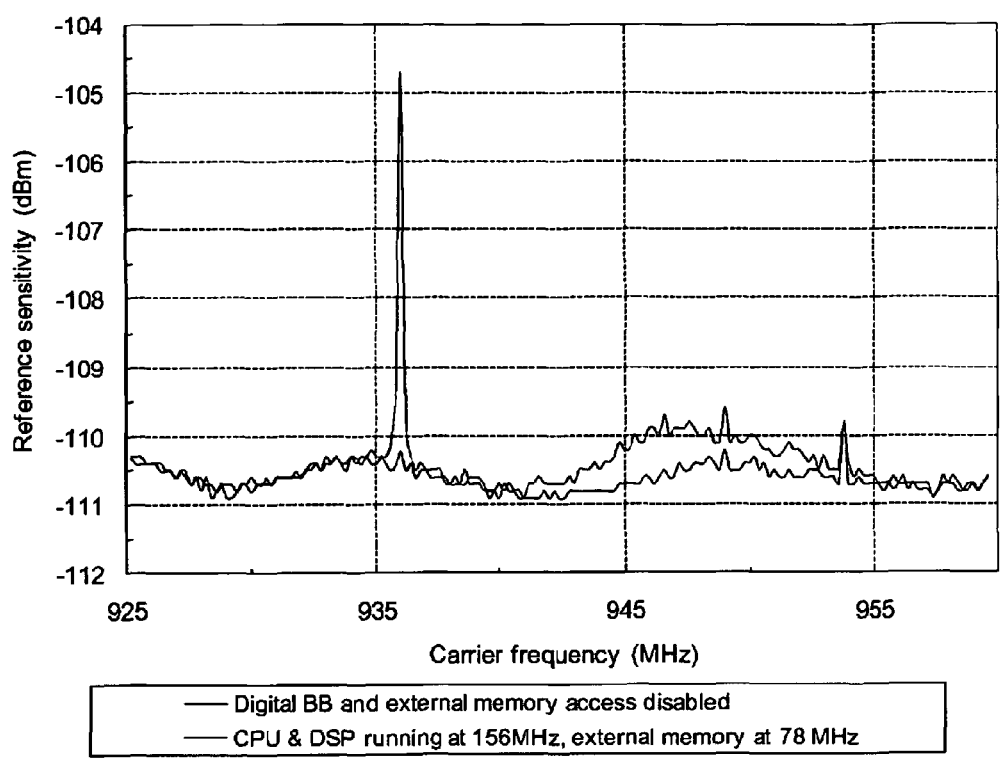
FIG. 4 illustrates measurement performed across all operating channels of the 900 MHz band, with an example of a reference clock of 26 MHz, and particularly the GSM voice reference sensitivity vs. carrier frequencies in the GSM 900 frequency band with and without BB digital (DSP & CPU) and external memory access.

As known by the skilled man, the 82th harmonic of a 26 MHz clock falls directly in-band of a 2132 MHz WCDMA carrier. If the aggressor clock source is gated, then basic properties of the FIG. 2 show that multiple clock spurs may occur and each fall within the wanted carrier's BW. FIG. 3 shows that the impact on the victims sensitivity depends not only on the SJR power ratio but also on the absolute wanted carrier power received (Ior) by the victim.

As expected, the lower Ior, the less jammer power can the victim tolerate.

In one embodiment, the process involves the use of programmable digital filter for removing identified spur(s). In that way, one, or several notches (depending on the number of aggressors spurs detected within the victim's receiver (RX) BW) to are suppressed in the receiving chain.

In one particular embodiment, a programmable notch digital filter is used, such as for instance and without any limitation, a programmable Finite Impulse Response (FIR) digital programmable filter which carries out a predetermined set of notches. Preferably, up to four distinctive notches can be programmed at the same time.

Such approach has shown to be low cost in terms die area, but presents slight loss of RX processing gain, and therefore a slight sensitivity performance degradation.

In order to take into account this problem, the digital filter is activated only when the ratio of the power of one identified jammer spur divided by the value of the RSCP exceeds a predetermined, programmable threshold.

In one embodiment, the threshold is determined as a function of:
  The number of detected spurs falling in-band of the RX victim,
  The signal to jammer power ratio (SJR),
  The absolute power of the wanted carrier (Ior), Depending on these criteria, one or several frequency notches, of programmable carrier frequency and bandwidth are programmed dynamically within the BB digital receiver FIR filter to remove one, or several narrowband spur, as will be shown hereinafter with details.

The technique presented firstly need to assess the following aggressors properties:
  the jammer(s) frequency location, denoted "fj"
  the number of jammer spurs falling in-band, denoted "Nj"
  the absolute power of each spur received by the victim, "Pji", where "I" is an index ranging from 1 to "Nj".

In one particularly embodiment, the identification of one or more jammer spurs is achieved by means of a specific block located in the baseband, which performs a spectral analysis of the outputted complex i+jQ signal to the digital BB receiver IC, for instance, by conducting a Fast Fourier Transform at the same time when the antenna switch is switch to a state of high isolation between the signal received through the antenna and the input of the RF transceiver.

Such execution of a FFT operation is not known in 2G/3G modem. Thanks to this analysis, one can distinguish jammers from wanted carrier during a 3G call. As known by the skilled man, 3G communications are full duplex, which means that downlink transmission is continuous, as opposed to 2G downlink transmissions which are time division multiplexed. Due to the full duplex nature of WCDMA, it is normally difficult, or even impossible to estimate "$f_j$", "$N_j$", and "$P_{ji}$" during a call since both wanted and unwanted aggressors spurs will be measured by the digital BB IC I/Q power detectors, making the distinction between a spur power and the wanted signal power impossible, To solve this issue, there is proposed to take advantage of the unique robustness properties of WCDMA modulated carriers by switching ON/OFF the downlink received signal by means of the built-in front-end module antenna switch at some predetermined regular time intervals. Time gaps are thus created at appropriate instants during which only the aggressors clock spur harmonics coupled to the victim LNA inputs are received, while the WCDMA carrier is isolated by the antenna switch, and therefore sufficiently attenuated to ensure good FFT analysis.

Figure 5:
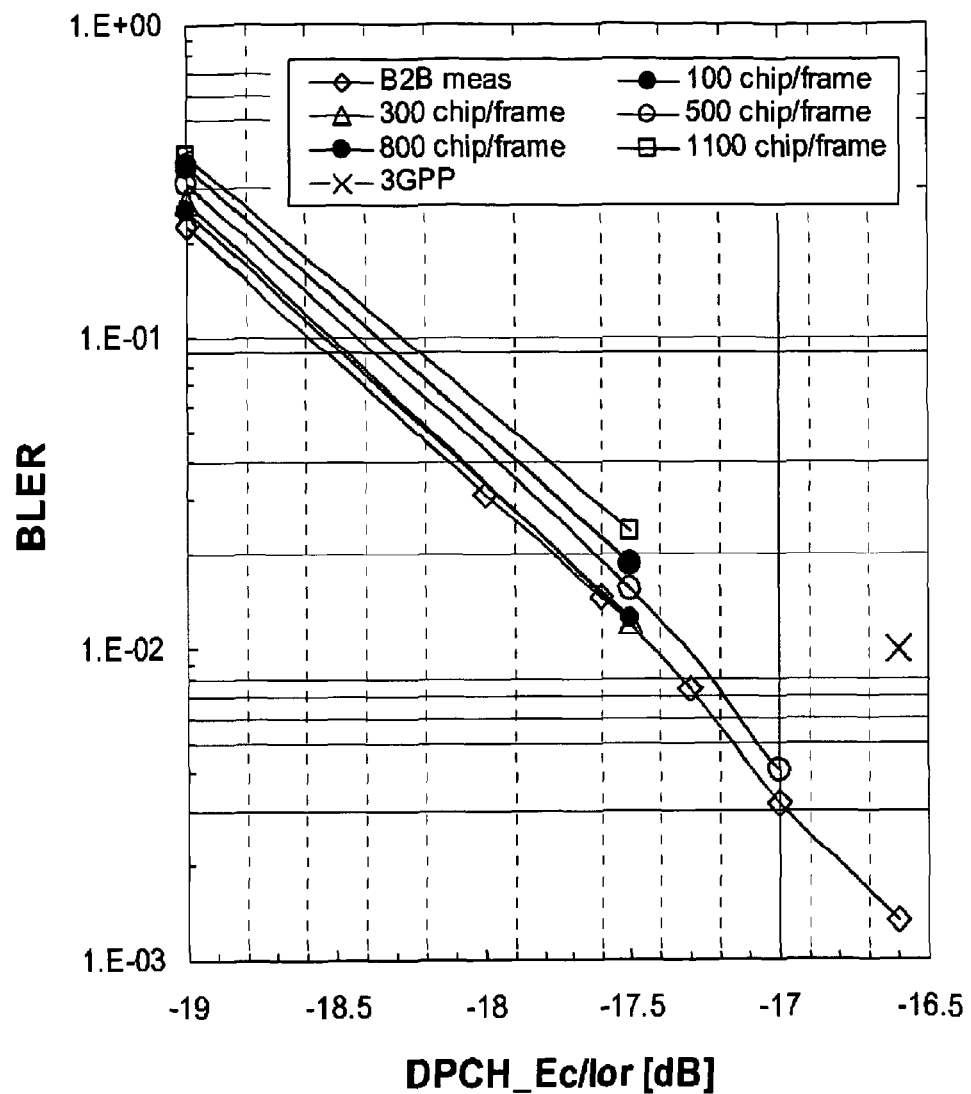
FIG. 5 illustrates the impact of variable length downlink modulated carrier slicing onto the Block Error Rate performance of a release 99 384 kbit/s BB IC in static AWGN conditions. B2B=Back to back performance, ie. with continuous reception (no slicing), 3GPP=3gpp conformance requirements, all other curves indicate the gap length of the slice expressed in a time units of WCDMA chips (at 3.84 Mchip/s) per UMTS frame.
Figure 6:
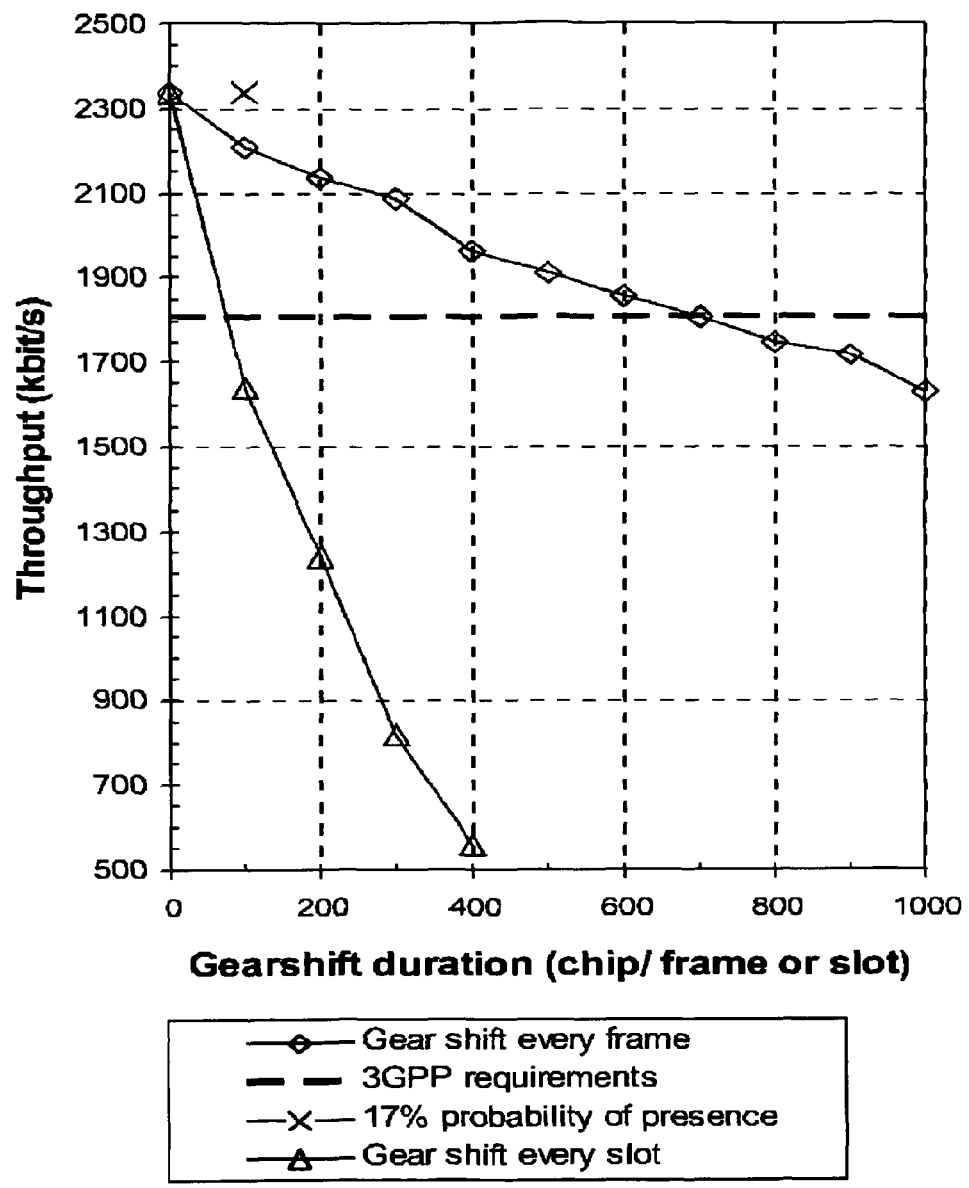
FIG. 6: illustrates the Impact of variable length downlink modulated carrier slicing (denoted gearshifting in the x-axis legend) onto the throughput performance of a release 5 HSDPA BB IC in the pedestrian 3 km/h multipath fading environment.

FIGS. 5 and 6 respectively illustrate the impact of variable length slicing gap length onto the Block Error Rate (BLER) performance of a rel'99 WCDMA BB IC, as well as on the throughput performance of an HSDPA category 8 BB IC performance.

Referring particularly to FIG. 5, there is illustrated the impact of variable length downlink modulated carrier slicing onto the Block Error Rate performance of a release 99 384 kbit/s BB IC in static AWGN conditions. B2B=Back to back performance, ie. with continuous reception (no slicing), 3GPP=3gpp conformance requirements, all other curves indicate the gap length of the slice expressed in a time units of WCDMA chips (at 3.84 Mchip/s) per UMTS frame.

In FIG. 5, it can be seen that up to 500 chips can be sliced every UMTS frame, and yet only degrade the modem IC intrinsic system performance indicated by the curve entitled "B2B" by only 0.2 dB in the DPCH_Ec/Ior ratio (equivalent to SNR power ratio)

Referring particularly to FIG. 6, showing the Interface Duty Cycles (DigRF) in the case of a 1248 Mbps digital Interface and in accordance with the Protocol Payload Lengths (bits), it can be seen that 2 slice length of 200 chips every frame leads to a 10% loss of throughput relative to the performance in continuous reception.

From FIGS. 5 & 6, it can be concluded that HSDPA transmissions set the most stringent requirements for slicing the signal, with a budget of approximately 150 to 200 chips per frame to prevent degradation of the Baseband (BB) IC performance.

Figure 10:
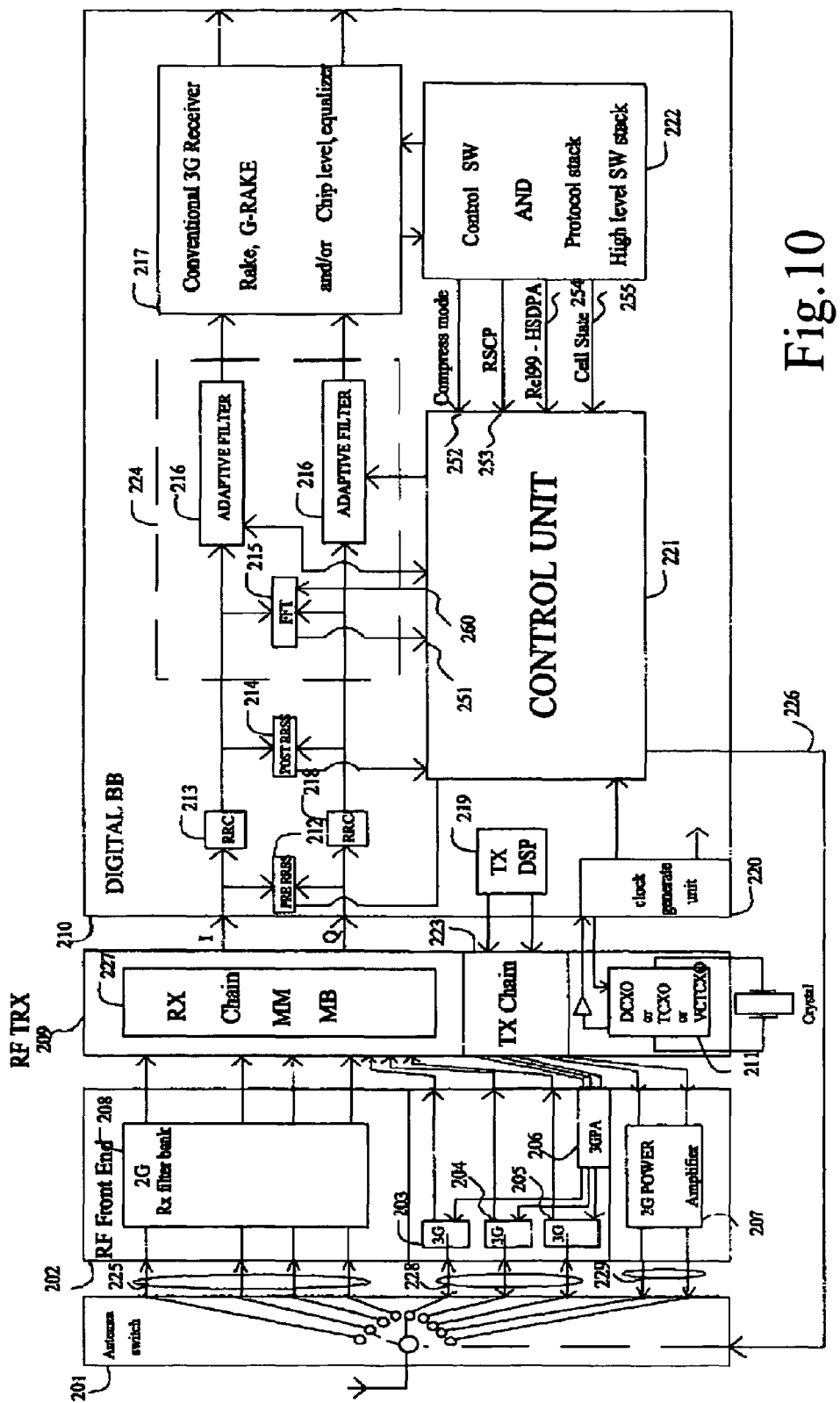
FIG. 10 illustrates one particular embodiment of an integrated chip in accordance with the present invention.

With respect to FIG. 10, there is now described one integrated receiver in accordance with one embodiment of the present invention.

The receiver of FIG. 10 includes an antenna switch 201 which is controlled by a control lead 226 and which is used for switching the receiver on different modes, i.e. on different emitters (GSM or UMTS) or different bands.

Antenna switch 201 includes a set of input leads and a set of output leads which are respectively connected to a set of corresponding outputs and inputs of a RF Front end circuit 202 containing the appropriate RF filters and amplifiers required for the different GSM and UMTS bands.

RF Front end circuit 202 includes a bank of filters 208—a so-called 2G Rx filtering bank—which consists in the filters required for the four GSM bands being supported. In addition RF Front end 202 includes a 2G Power amplifier 207 and three UMTS duplexers 203, 204 and 205, each corresponding to one particular UMTS band.

FIG. 10 particularly shows that antenna switch 201 has four output leads or ports 225 which are connected to corresponding inputs or ports of 2G Rx filtering bank 208, each port dedicated to one particular GSM band such as, for instance the bands 800 Mhz, 900 Mhz, 1800 Mhz and 1900 Mhz. In addition, antenna switch 201 includes two input leads 229 which are respectively connected to the two outputs of 2G Power amplifier 207 generating the Tx signal to transmit through the lower bands (800 Mhz, 900 Mhz—band II & III EGPRS) and the higher bands (1800 Mhz, 1900 Mhz—band V & VIII EGPRS).

Under control of a signal conveyed through control lead 226, antenna switch 201 switches the signal received from the antenna to one of the four inputs corresponding to the appropriate GSM mode 800 Mhz, 900 Mhz, 1800 Mhz and 1900 Mhz modes. It should be clear that such modes are only given as examples and that the skilled man will straightforwardly adapt the teaching of the invention to other configurations.

In addition to the GSM mode, antenna switch 201 provides support to three different UMTS bands, e.g. WCDMA bands I, II and V.

For that purpose, antenna switch 201 comprises three bidirectional ports 228, each port being connected to one respective duplexer 203, 204 or 205.

Each duplexer 203-205 further comprises one input connected to the corresponding output of one 3G Power amplifier 206 generating the Tx RF signal for the appropriate WCDM band, and further includes one output generating the RF Rx signal which will be conveyed, via appropriate wiring, to the RF transceiver 209.

In addition to the Antenna switch 201 and RF front end 202, the receiver of FIG. 10 further includes a RF transceiver 209 which is a Transmit Receive Radio integrated circuit, the latter comprising appropriate inputs and output ports allowing connection to RF front end 202, and particularly with the 2G Rx filter bank 208, the 2G Power amplifier 207, the duplexers 203-205 and the 3G power amplifier 206 in a manner well known to the skilled man.

Similarly, RF transceiver 209 further includes a block 223 which is a transmission chain (uplink) achieving modulation in multiple modes (MM), multiple bands (MB).

Similarly, RF transceiver 209 further includes a block 223 which is a transmission chain (uplink) receiving the achieving modulation in multiple modes (MM), multiple bands (MB).

In addition, RF Transceiver 209 includes appropriate clocks generating circuits 211, e.g. based on well known DCXO, or a TCXO or a VCTCO oscillator clocked by a crystal.

With respect to FIG. 10 again, one sees that the receiver of FIG. 10 further includes a digital baseband circuit 210 which, in one particular embodiment, is integrated in the same die than the RF transceiver 202 (System on Chip or SOC).

Alternatively, baseband circuit 210 may be manufactured in a die which is distinct from the one used for the RF transceiver 202, but is still integrated in the same package (System In Package SIP).

While the spur removal technique which is described herein after may be implemented inside the RF transceiver, in one particular embodiment which will now be described the spur removal will be embodied within the baseband.

Indeed, in one particular embodiment, Baseband circuit 210 comprises a first set of circuits and components which are conventional to any known baseband adapted to the 3G communication mode, and furthermore a second set of circuits which will be used for achieving spur mitigation technique.

1) Conventional Circuits of Baseband 210.

Among the conventional circuits, Baseband 210 first includes, in the Xmit chain, the known digital signal processing embodied into a Tx DSP block 219 for providing the I and Q components of the transmit signal to the Tx chain 223 of RF Transceiver 219.

In addition, Baseband 210 includes an appropriate clock generating unit 220 which, generally, may use the clock generated by block 211 of RF Transceiver 209.

In addition to those, baseband 210 further includes the conventional Relative Receiver Signal Strength (RRSS) filters well known in a WCDMA receiver.

In one particular embodiment, the RRSS filtering is shared between a first PRE and a second POST RRSS filters, respectively 212 and 214.

PRE RRSS 212 is located upward a set of two Root Raised Cosine (RRC) filters 213 and 218 respectively dedicated to the filtering of the I and Q components of the Rx received signal.

Conversely, POST RRSS 214 is located downward the two RRC filters 213 and 214.

Therefore, the two I and Q components of the received signals are successively processed by the first PRE RRSS filter 212, then the RRC filters 213 and 218, and then the POST RRSS filter 214.

The use of RRSS and RRC filters is well known to the WCDMA receivers designers and will not be further developed. It suffices to note that the use of PRE RSSS 212 and POST RSSS 214 results in the possibility to distinguish the power which is detected within the band (wanted signal) and outside the bands.

Baseband 210 further includes a conventional 3G receiver 217 which may be based on either a rake receiver, a G-rate receiver or a chip-level equalizer, or any equivalent architecture well known to the skilled man, which communicate with a block 222 embodying the Control Software and high level Protocol Stack of the mobile telephone.

Figure 1:
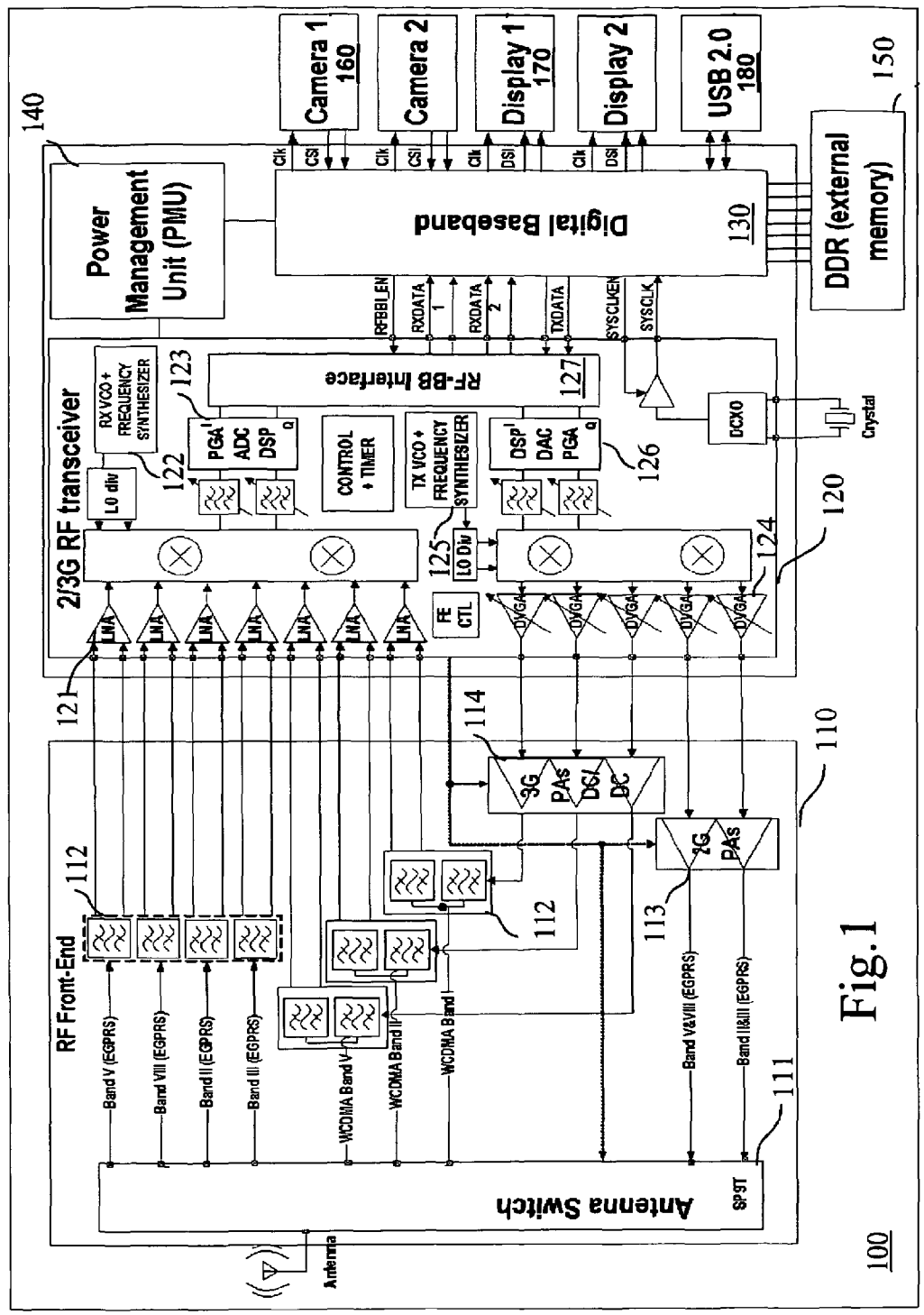
FIG. 1 illustrates the general architecture of a multiple band 2G/3G mobile phone grouping on a single die the functions of RF front end and receivers, the baseband and the power management unit.

In addition to the conventional RRSS blocks 212 and 214 and RRC 213 and 218, the baseband circuit 210 is arranged to provide with many peripheral devices which are now incorporated into a modern mobile phone, such as a camera, one or more displays, a USB port and even internal or external memories as illustrated in FIG. 1 and, for the sake of clarity, not represented in FIG. 10.

As discussed in the background art part, such communication with peripherals generate a significant amount of interference, and particularly a set of spurs spoiling the received signals.

Such spurs will be detected by the PRE RSSS block 212 and the POST RSSS block 214 as being power, although those will not carry any useful data.

2) New and Additional Elements of Baseband 210.

In order to eliminate part of the spurs being coupled to the 3G receiving chain, the baseband 210 further includes new and additional circuits which will now be described in detail.

Baseband particularly includes a circuit 224 which, under control of a control unit 221, achieves two functions:

firstly, a filtering process performed by a set of filters 216—such as a FIR filter for instance—for the purpose of suppressing one or more identified spur(s);

secondly, and optionally—a FFT computation (or any equivalent discrete Fourier transform) achieved by a FFT circuit 215 so as to perform an analysis in the frequency domain of the received signal at appropriate and critical instants discussed below.

It should be noticed that the use of the FFT circuit 215 is optional since, in some circumstances, some spurs are perfectly identified.

This is particularly the case of the 82th harmonic of a 26 MHz clock which is known and can be processed without involving a FFT.

However, in most situations, one can take a great advantage of the use of FFT block which provides accurate spectrum analysis in order to identify the number and the power of the jammer spurs which need to be suppressed.

FFT block 215 is under control of a control unit 221 which includes four distinctive input leads which receive the following information from the Control software and protocol stack 222:

the COMPRESS MODE status (lead 252):
the RSCP (leads 253)
the particular mode of transmission, ie Rel99 or HSDPA (lead 254);
the Cell state (lead 255)

In addition, the control unit receives on a lead 251 the result of the FFT performed by FFT block 215.
From that information, the control unit 221 generates a set of control signals, in accordance with a state machine which will be described in reference to FIG. 11, which particularly includes a control lead 260 controlling the start of the FFT computation and control lead 226 controlling the switching of the antenna switch 201 to a position offering high level of isolation of the receiving chain with respect to the signal received from the antenna.

Figure 7A:
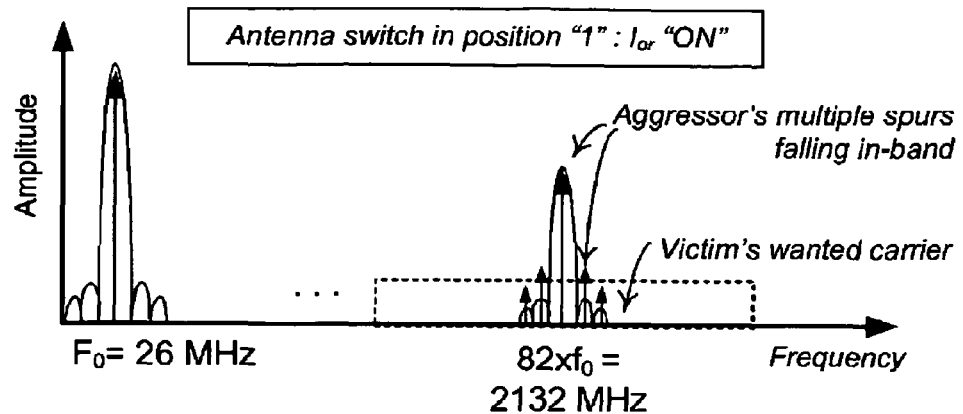
FIGS. 7a and 7b illustrates an example of WCDMA downlink carrier slicing at Ior>=−100 dBm/3.84 MHz and RF receiver gain set to its maximum value (lowest NF) for a victim's carrier frequency set to 2132 MHz.
Figure 7B:
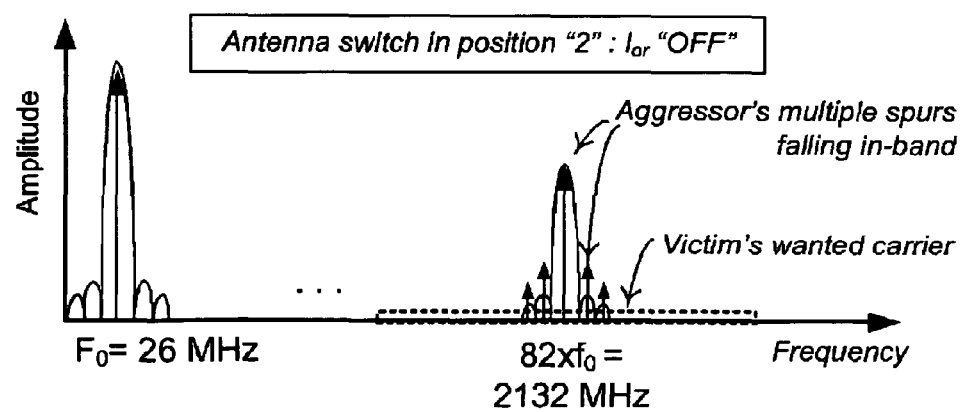

The slicing is accomplished by toggling the antenna switch from the UMTS band 1 (position 1) to a position which provides the highest antenna to LNA input isolation. For instance, antenna switch 201 can be controlled by control unit 221 so as to switch the incoming signal from the antenna to the GSM900 (UMTS Band VIII) while letting the WCDMA receiver gain settings to the highest gain and lowest Noise Floor (NF). The spectra as observed at the victim's LNA input are illustrated in FIG. 7 at Ior>=−95 dBm/3.84 MHz. It can be noticed that at Ior lower than −100 dBm/3.84 MHz the scheme is no longer applicable since the internal receiver noise floor is in the range of −102 dBm/3.84 MHz for a 6 dB NF device. The jammer frequency location and absolute power assessment can therefore only be performed accurately provided that the FFT receives I/Q samples with sufficiently high SNR. At an equal power, each narrowband spur power spectral density (PSD) are by definition high than the PSD of the wanted carrier power, thereby making its measurements easier to perform in the frequency domain. The absolute power of each spur can be simply computed since the gain applied by the RF RX chain is known at any moment in time.

Figure 8:
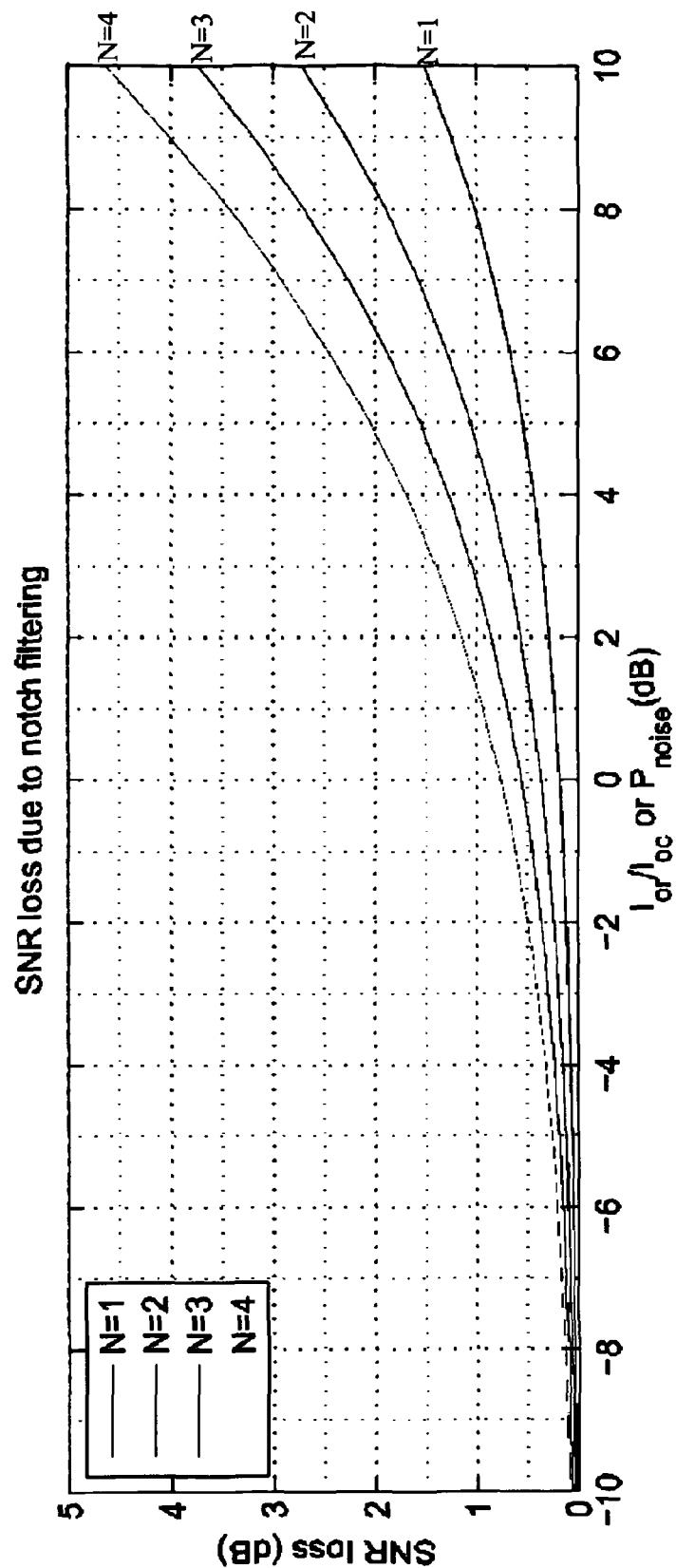
FIG. 8 illustrates the DPCH_Ec/No degradation vs. number of FIR notches and notch BW.
Figure 11:
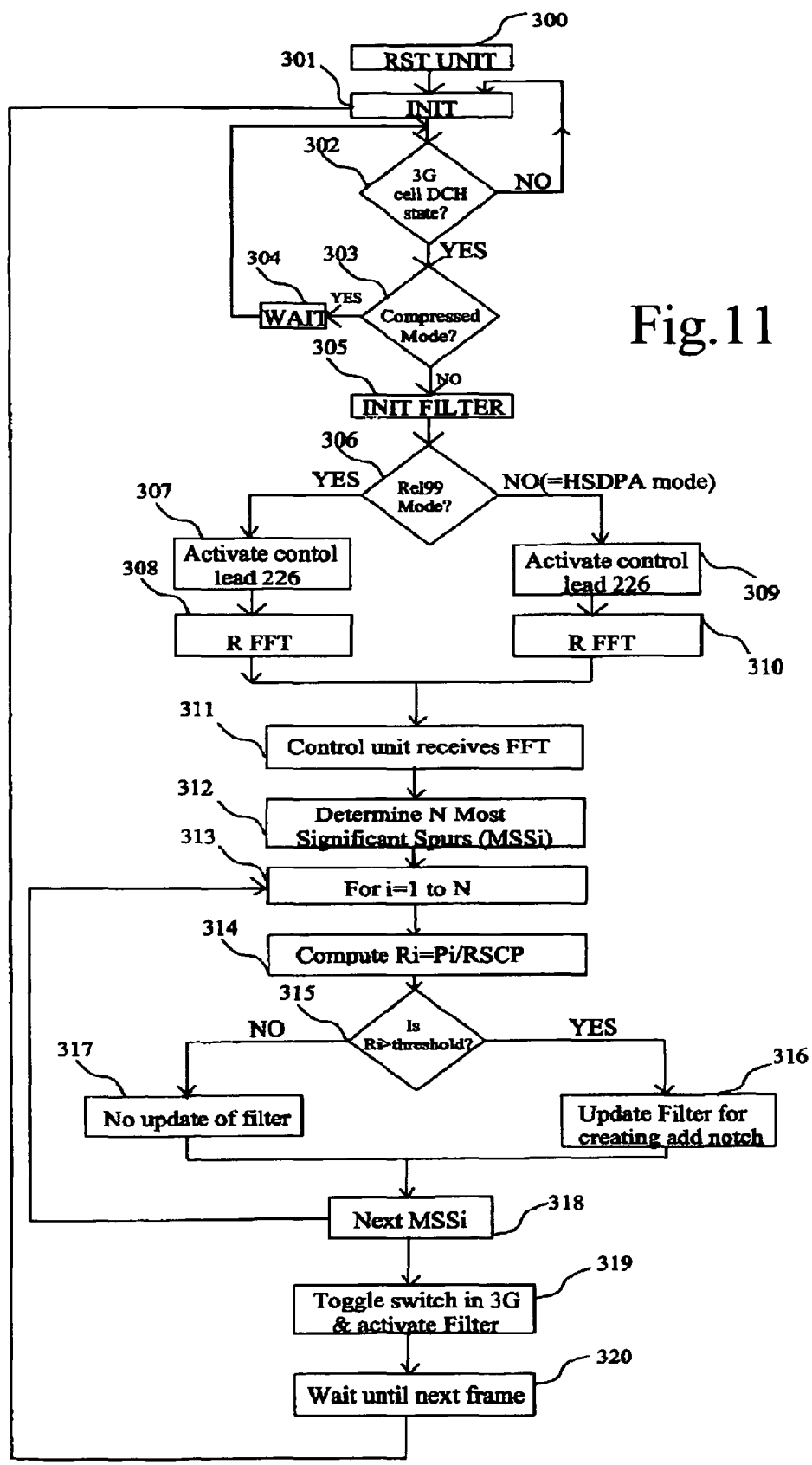
FIG. 11 illustrates on embodiment of a process for controlling the FFT computation.

Once the frequency location and absolute powers of each is found and determined by control unit 221, the latter further determine, in accordance with the state machine illustrated in FIG. 11, if notching is required or not. The threshold of SJR and Ior absolute value depends on the number of spurs that are known to create a performance degradation based upon the properties of WCDMA plotted in FIG. 3. Indeed, the higher the number of FIR notches, and the wider the BW of each notch, the greater the loss of receiver sensitivity as illustrated in FIG. 8.

The threshold must therefore be computed so that notching does not add more degradation to receiver sensitivity than just letting the spur go through the victim's receiver chain. Since the impact of a spur power depends on Ior, and Ior/Ioc, this invention calls for a set of pre-programmed thresholds associated with each of the curves plotted in FIG. 3. The threshold must minimize the SNR degradation at a given 3GPP quality metrics (BER, BLER, throughput or other means of measuring the downlink received signal quality). An example of the notch removal and decision process is illustrated in FIG. 9.

Figure 9A:
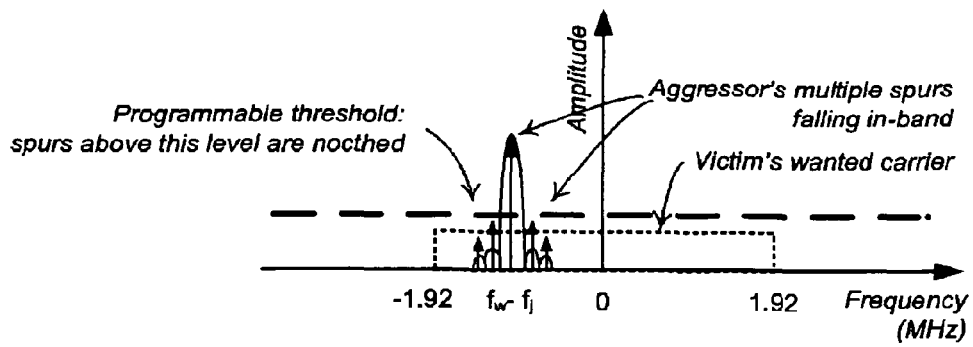
FIGS. 9a to 9c illustrate Spur removal scheme example showing complex i+jQ downconverted I/Q spectrum.
Figure 9B:
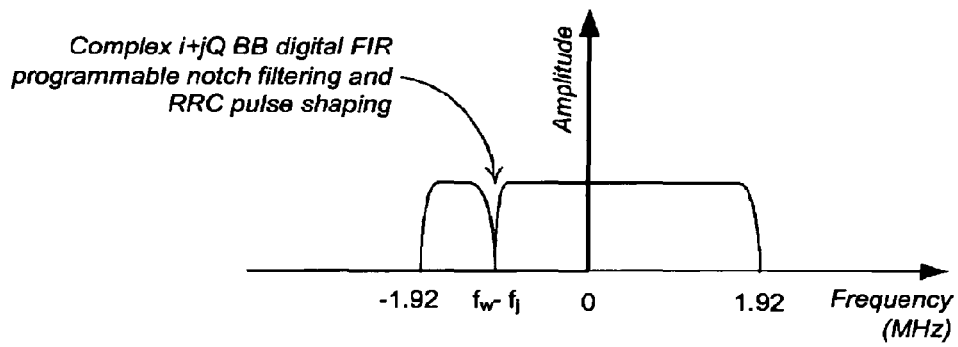
Figure 9C:
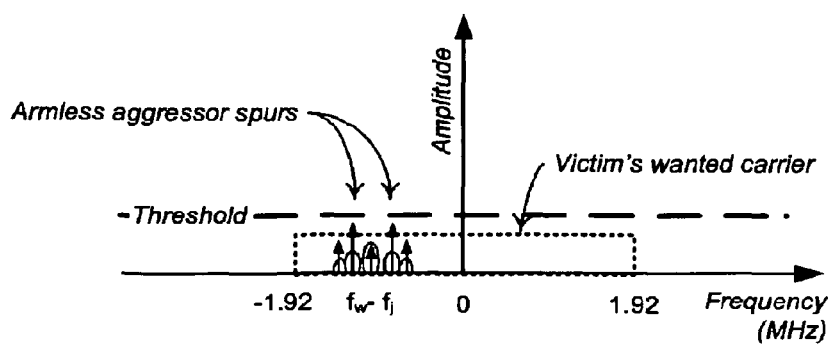

In the example of FIG. 9, a cluster of spurs have coupled through the victim's receiver chain and it is assumed that the previously described FFT analysis has been performed to identify the jammer spurs properties. FIG. 9 (a) shows the decision threshold which has been computed to minimize SNR loss in presence of such spurs, given the receiver Ior, and Ior/Ioc, and the set of optimization constraints data presented in FIG. 3 and FIG. 8. In this example, only the strongest spur exceeds the decision threshold. FIG. 9 (b) shows the FIR digital filter impulse response is changed accordingly to maintain RRC properties as required by the 3GPP standard, but now also includes sufficient notch filtering to remove the identified spur. FIG. 9 (c) shows the spectrum after notch filtering, including residual jammer spurs which do not impact system performance.

Generally speaking, the FFT computation can be performed at different instants which are compatible with the particular mode of operation of the receiver. In 2G and sometimes in 3G (in PCH and FACH modes), the communication is bursted which allows some possibility to switch the antenna switch to a high isolation level.

However, one specific UMTS mode, that is to say the DCH mode shows particularly difficult since it is a non bursted mode.

There will now be described, with respect to FIG. 11, one embodiment of a process which still achieves, even in that delicate situation of non bursted mode, the spur mitigation technique.

In a step 300, the process starts with a general reset (RST) of the spur mitigation method.

In a step 301, the process proceeds with an initialization for the purpose of processing a new frame.

Then, in a step 302, the process proceeds with a first test in order determine whether the receiver is in a DCH state.

If the state does not show to be a DCH state, then the process goes back to step 301 without any processing. Indeed, when the mobile is not in the DCH state, this means that it can be either in a CELL PCH or CELL FACH state which, as known by the skilled man, are bursted modes which offer some possibilities or time windows for performing a FFT for the purpose of determining possible spurs . . . . In those cases, the control unit may use the gaps offered by those modes for the purpose of controlling antenna switch 201 so as to perform an appropriate spectrum analysis for the purpose of identifying the possible spurs.

If the state is a DCH state, corresponding to the critical non-bursted mode, then the process proceeds to a step 303 which is a new test for determining whether the so-called COMPRESS MODE is active.

Such information is particularly provided by the higher level protocol stack through control lead 252 in FIG. 10. It should be recalled that, generally speaking, the compress mode is under control of the base station which, at some predefined instants, controls the receiver so as to allow the latter to switch its receiver to another mode (GSM for instance), for instance for the purpose of investigating a new GSM band.

While the compress mode is conventionally under control of the base station, one can see, as described below, that the same effect can be achieved under control of the control unit 221 which is part of the mobile telephone, in order to achieve an effective spur mitigation technique.

If the test of step 303 shows that the receiver is in status of COMPRESS MODE The process then proceeds to a step 304 which is a waiting loop so as to differ the switching of the antenna switch and, after a predetermined period, the process proceeds back to step 302, to ensure that the DCH state is still active. It should be noticed that if the receiver has been switched on a 2G mode, the process is no longer required since the 2G mode is a burst mode which already allows possibility of FFT computation.

If the test of step 303 has shown that the receiver is in no compress mode scheduled by the base station, then the process proceeds with a step 305 where the default parameters of the hardware elements are loaded. In particular, the adaptive filter 216 is initialized by means of the loading of the appropriate setting parameters ensuring all pass filter characteristics. Similarly, control unit 221 deactivates control lead 260 so as FFT block 115 does not perform any FFT computation, and similarly control lead 226 is disactivated so as to set the antenna switch 201 to a conventional 3G mode.

The process then proceeds to a step 306 which is a test in order to determine whether the receiver is in a rel99 mode. This is achieved by determining the status of lead 254 conveying the signal Rel99/HSDPA generated by the higher lever Protocol stack of the mobile.

If not, then the process proceeds to a step 309 where control unit activates control lead 226 so as to control antenna switch 201 to a high isolation state.

Then, in a step 310 the process proceeds with the start of a FFT computation on the I and Q components of the signal received by the baseband so as to perform a spectrum analysis of the received signal.

This FFT computation allows the generation of a "picture" of the spectrum of the received signal, including the EMI radiation generated by the different components and peripherals spoiling the receiver, and taking the form of a certain number of spurs or jammers. More particularly, the FFT leads to the knowledge of:

the number of jammer spurs falling in-band,

The power of each jammer spur,

In one embodiment, the FFT is computed during a period which corresponds to a set of about 500 chips.

If the test of step 306 showed that the receiver was in a Rel99 mode, then the process proceeds to steps 307 and 308 which are similar to the steps 309 and 310 performed in the case of a HSDPA mode, with the difference that the time allocated for the computation of the FFT is set to period of 800 chips instead of 500 chips.

Therefore, in step 307 control lead 226 is activated so as to set the antenna to switch to the isolation mode, and, in step 308, the FFT computation on the I and Q components is conducted so as to elaborate a representation, in the frequency domain of the received signals including the spurs.

It can be seen that FFT computation of step 308 may take more chips than the computation of step 310. This results from the fact that, in rel99, the data rate is inferior than in HSDPA and, therefore, a longer period may be given to the FFT computation of step 308.

After completion of step 308 (in rel99) or step 310 in HSDPA, FFT circuit 215 is able to provide to control unit 221 a digital representation, in the frequency domain, of the spectrum of the signal within the considered WCDMA band, including the spurs.

In a step 311, the control unit 221 receives such digital representation via a lead 251.

Then, in a step 312, the control unit determines the N Most Significant Spurs spoiling the spectrum representation. In one particularly embodiment, the control unit is able to determine up to four distinctive spurs or jammers.

Then, the process enters a FOR loop in a step 313 so as to process each individual spur (for i=1 to N) identified in the spectrum.

Then, in a step 314, for each spur i which was identified, the process computes a ratio $R_i$ which is equal to the power of the considered spur divided by the value of the Received Signal Code Power (RSCP) returned by the high level protocol stack.

Then, the process proceeds to a step 315 which is test for comparing the computed value $R_i$ with respect to a predetermined threshold value.

This threshold depends on:

The number of detected spurs falling in-band of the RX victim,

The signal to jammer power ratio (SJR),

The absolute power of the wanted carrier (Ior),

If ratio $R_i$ shows to be superior to the threshold, then the process proceeds to a step 316 where the filter 218 is updated so as to create one additional notch in the filtering process.

Figure 12:
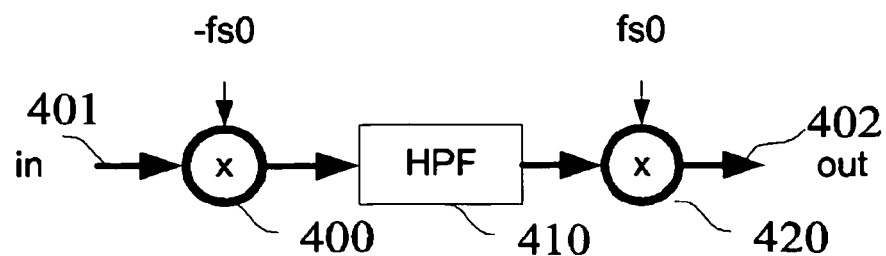
FIG. 12 illustrates one particular embodiment of a filtering circuit adapted for performing a single spur removal.

Two particular embodiments of a filtering circuit adapted to perform spur removal will be described below in reference to FIGS. 12 and 14.

In one embodiment, the filtering circuit 216 is capable of generating four distinctive notches which are fully programmable.

Conversely, if ratio $R_i$ is inferior to the threshold, then the process proceeds to a step 317, where no updating is being performed into filter 216.

After completion of steps 316 or 317, the process then proceeds to a step 318 which is a NEXT step for the purpose of determining whether one additional Most Significant Spur needs to be considered within the list of N spurs identified during step 312.

If so, then the process loops back to step 313 for the purpose of processing a next MSSi or, conversely, the process exits the FOR lop and proceeds to a step 319 where the antenna switch is toggled again to a 3G configuration.

This is achieved by means of control lead 226 and allows the RF receiver to receive again the RF signals from antenna.

The process then proceeds to a step 320 which consists in the waiting until the occurrence of the next frame. During the whole active frame, the FIR filter is set to the programmed value so as to remove the spurs and jammers identified in step 312.

The process then proceeds back to step 301 for the purpose of processing a new frame.

With respect to FIG. 12, a particular embodiment of a filtering circuit which is suitable for embodying circuit 218, will now be described. The filtering circuit comprises an input 401 and an output 402 and between, connected in series, a first digital mixer 400, a high pass filter 410, then followed by a second digital mixer 420

Digital mixers 400 and 420 achieve complex multiplication for the purpose of performing frequency translation. In one embodiment digital mixers 400 and 420 are so-called Coordinate Rotation Digital Computer (CORDIC) employing 25 algorithms known to calculate hyperbolic and trigonometric functions. Such blocks are well known to a skilled man and will not be further discussed. Briefly, CORDIC mixer 400 receives the signal at input 401 and performs a frequency shifting of the latter. By means of that frequency shifting, the spectrum is shifted such that the spur located at a frequency of fs0 is shift so as to coincide with the 0 frequency (ie DC).

The circuit further comprises an High Pass filter block 410 having an input receiving the output signal generated by CORDIC mixer 400. Preferably, High Pass Filter block 410 is tunable in terms of notched bandwidth.

The circuit at last comprises a second CORDIC mixer 420—similar to CORDIC mixer 410, which has its input receiving the output of HPF filter 410. CORDIC mixer 420 performs a second frequency shifting which is opposite to the one performed by CORDIC mixer 400.

Therefore, the output of CORDIC mixer 420 generates at output 402 a signal having a spectrum wherein the spur fs0 is being removed.

Figure 14:
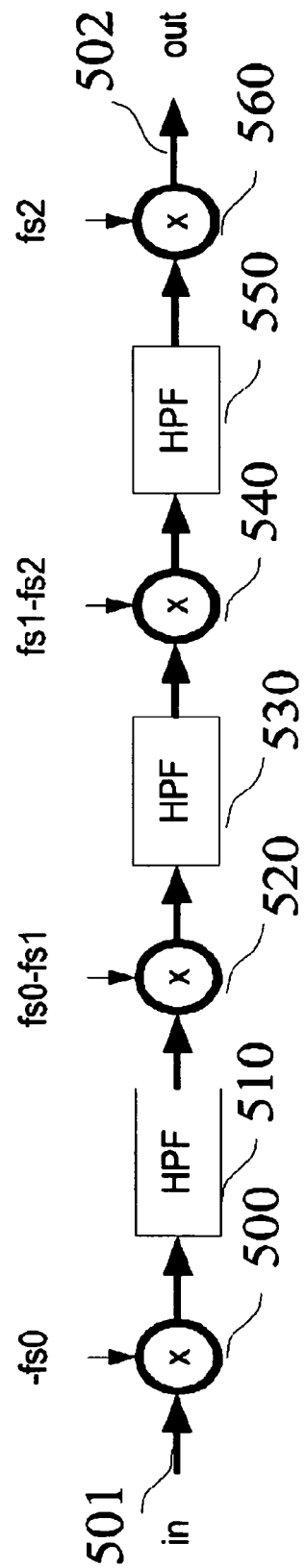
FIG. 14 illustrates another embodiment of a filtering circuit adapted for performing three individual spur removal.

With respect to FIG. 14, one will now describe a second embodiment of a filtering circuit, having an input 501 and an output 502, which is arranged for achieving removal of a set of three individual notches or spurs.

Filtering circuit comprises a first CORDIC mixer 500 receiving at the input 501 the input signal. As was described previously, first CORDIC mixer performs a frequency shifting so as to shift frequency fs0 to the DC.

The filtering circuit then comprises a first High Pass Filter 510 receiving the output of first CORDIC mixer 500 for the purpose of eliminating the DC component. As described above, HPF 510 is tunable in term of notched bandwidth.

The filtering circuit further comprises a second CORDIC mixer 520 arranged for performing a frequency shifting of a value of fs0-fs1, fs0 and fs1 respectively corresponding to two individual spurs which need to be suppressed. This corresponds to the operation of placing the second spur frequency fs1 at the DC value.

The filtering circuit then comprises a second High Pass Filter block 530 which is also tunable.

The filtering circuit then comprises a third CORDIC mixer 530 which is arranged for performing a new frequency shifting of a value of fs1-fs2, where fs2 correspond to the third spur to be removed. By means of that third CORDIC mixer 530, one sees that the third spur frequency fs2 is now placed at the DC value.

The filtering circuit then includes a third High Pass Filter 550 which can be identical to the first and second High Pass filter and which has the function of removing the DC frequency.

At last, the filtering circuit includes a fourth CORDIC mixer 560 causing an additional frequency shifting so as to re-establish the original spectrum, of which the three spurs fs0, fs1, fs2 are being suppressed.

FIG. 14 therefore shows one particular embodiment of one filter achieving suppression of three individual spurs. Clearly, any number of spurs could be considered by means of the arrangement of appropriate CORDIC mixers combined with proper High Pass Filters so that, finally, filtering circuit 216 can be a fully programmable multinotch filter for any number of individual notch.

Figure 13:
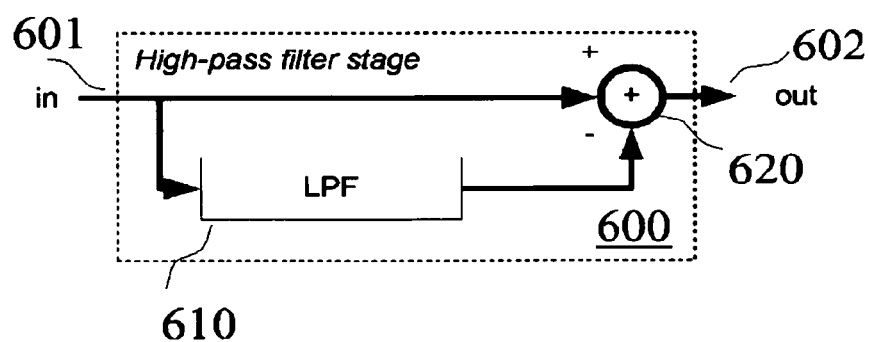
FIG. 13 shows one particular embodiment of a High Pass Filter suitable for performing the embodiment of FIG. 12.

With respect to FIG. 13, there is now described one particular embodiment of a High Pass Filter 600 having an input 601 and an output 602, which can be used for embodying High Pass Filters 410, 510, 530 or 550.

One sees that High Pass filter 600 comprises a Low Pass Filter 610 combined with a substractor 620, the positive input of the latter and the input of the former both receiving the input signal at input 601.

In addition, the negative input of substractor 620 receives the output of Low Pass Filter 601 and the output of substractor is then connected to the output 602 of High Pass Filter 600.

Such embodiment has very low complexity compared to other implementations and shows to be particularly adapted to the application being considered.

The invention is particularly adapted to the WCDMA but, clearly, any other radio systems (cellular GSM-WCDMA-CDMA-TDSCDMA-LTE & Connectivity WLAN . . . ) can take advantage of the spur removal technique which is disclosed.

The invention claimed is:

1. A radio transceiver including:
    an antenna switch having a control lead;
    a RF front end circuit coupled to said antenna switch and operating in at least one mode;
    a RF transceiver coupled to said RF front end and operating in at least one mode;
    a baseband circuit communicating with a set of peripherals and external devices, said baseband circuit further comprising:
        a control unit for controlling said antenna switch so as to put a receiving chain in an isolated mode with respect to the signal received from said antenna;
        a FFT circuit controlled by said control unit and operative to perform a FFT computation to identify a set of at least one spur and jammer generated by EMI radiation; and
        a programmable adaptive filter controlled by said control unit for the purpose of introducing at least one notch for eliminating said at least one spur and jammer generated by EMI radiation.

2. The radio transceiver according to claim 1, wherein said baseband circuit further includes a circuit to perform, under control of said control unit, a FFT computation for the purpose of elaborating a representation of the different spurs spoiling the received signal when in isolated mode.

3. The radio transceiver according to claim 2, wherein said programmable adaptive filter is a Finite Impulse Response filter.

4. The radio transceiver according to claim 1, wherein said RF transceiver and said baseband circuit are integrated in a same integrated circuit, either in a System on Chip or in a System or package.

5. The radio transceiver according to claim 1, wherein said radio transceiver is adapted to support four 2G bands and three 3G bands.

6. The radio transceiver according to claim 1, further comprising at least one camera communicating with said baseband circuit.

7. The radio transceiver according to claim 1, further comprising at least one display which communicates with said baseband circuit.

8. The radio transceiver according to claim 1, further comprising at least one USB peripherals which communicates with said baseband circuit.

9. The radio transceiver according to claim 1, further comprising one or external or internal DDR storage communicating with said baseband circuit.

10. The radio transceiver according to claim 1, wherein said programmable adaptive filter further comprises:
    a first digital mixer receiving the input signal and performing a frequency shifting of the latter so as to shift a first frequency to DC;
    a High Pass Filter for suppressing the DC component; and
    a second digital mixer for perform a new frequency shifting for the purpose of re-establishing the spectrum, at the exception of the removed first frequency.

11. The radio transceiver according to claim 10, further comprising, in cascade, numerous digital mixers, each performing a frequency shifting and two consecutive digital mixers being separated by a High Pass filter, so that multiple spurs can be simultaneously removed.

12. The radio transceiver according to claim 10, wherein said High Pass Filter is based on a Low Pass Filter combined with a substractor.

13. A mobile communication device, comprising:
    a radio transceiver comprising:
        an antenna switch having a control lead;
        a RF front end circuit coupled to said antenna switch and operating in at least one mode;
        a RF transceiver coupled to said RF front end and operating in at least one mode;
        a baseband circuit communicating with a set of peripherals and external devices, said baseband circuit further comprising:
            a control unit for controlling said antenna switch so as to put a receiving chain in an isolated mode with respect to the signal received from said antenna;

a FFT circuit controlled by said control unit and operative to perform a FFT computation to identify a set of at least one spur and jammer generated by EMI radiation; and a programmable adaptive filter controlled by said control unit for the purpose of introducing at least one notch for eliminating said at least one spur and jammer generated by EMI radiation.

14. A method for suppressing at least one of spurs and jammers in a wide band receiver including an antenna switch having a control lead, a RF front end circuit coupled to said antenna switch, a RF transceiver coupled to said RF front end, said RF front end and said transceiver operating in at least one 2G mode and at least one 3G mode, and a baseband circuit communicating with a set of peripherals and external devices, said method comprising:

switching said antenna switch to put a receiving chain into an isolation mode with respect to the signal received from said antennas;

performing a FFT computation to identify a set of at least one spur and jammer generated by EMI radiation; and applying a digital programmable filter into said RF transceiver to generate a set of N notches corresponding to the N most significant spurs.

15. The method according to claim 14, further comprising for each identified spur or jammer:

computing a ratio of the power of said spur or jammer divided by an RSCP;

comparing said ratio with respect to a given threshold; and in response to said comparison, programming said digital programmable filter for the purpose of generating a notch corresponding to said spur if said ratio is superior to said given threshold.

16. The method according to claim 15, wherein said threshold depends on one of the following value:

the number of detected spurs falling in-band of said RF transceiver;

the signal to jammer power ratio; and the absolute power of the wanted carrier.

17. The method according to claim 14, further comprising applying a Finite Impulse Response digital programmable filter.

18. The method according to claim 14, further comprising determining whether a 3 G communication is a rel99 communication mode or a HSDPA and, in response to said determination, applying a different time limit for completing said FFT computation.

19. The method according to claim 14 wherein spur mitigation is achieved in a non bursted mode by means of the following steps:

performing an initialization at the receipt of any new frame;

performing a first test to determine whether the receiver is in a DCH state; and if the state does not show to be a DCH state, then go back to the processing of a new frame;

if the state is a DCH state, performing a second test for determining whether a COMPRESS MODE is active; and if a compress mode is active, proceeding to a waiting loop so as to differ the switching of the antenna switch and, after a predetermined period, then go back to the processing of a new frame;

if the compress mode is non active, then proceeding to the following steps:

initializing and configuring the adaptive filter to be an all pass filter; and deactivating FFT unit so as to prevent any FFT computation;

controlling said antenna switch so as to switch the antenna to a conventional 3G mode;

performing a third test to determine whether the receiver is in a rel99 mode; and if the receiver is not in a rel99 mode, controlling said antenna switch in a high isolation mode and proceeding with the start of a first FFT computation on the I and Q components of the signal so as to perform a spectrum analysis of the received signal, said analysis resulting in the identification of the number of jammer spurs falling in-band and the power of each jammer spur, said first FFT being based on a first number of chips; and if the receiver is in a rel99 mode, controlling said antenna switch in a high isolation mode and proceeding with the start of a second FFT computation on the I and Q components of the signal so as to perform a spectrum analysis of the received signal, said analysis resulting in the identification of the number of jammer spurs falling in-band and The power of each jammer spur, said first FFT being based on a second higher number of chips;

determining the N Most Significant Spurs spoiling the spectrum representation;

entering into a FOR loop for the purpose of processing each individual spur identified among said N most significant spurs, and for each identified spur, computing a ratio Ri equal to the power of the considered spur divided by the value of the Received Signal Code Power (RSCP) returned by the high level protocol stack;

comparing the computed value Ri with respect to a predetermined threshold value; and if the ratio Ri is superior than said threshold value, then updating the filter so as to create one additional notch for the purpose of eliminating said spur;

if the ratio Ri is inferior than said threshold value, then performing no update of said filter;

performing a next spur among the list of said N Most significant spur; and at the completion of the processing of all spurs among said list of N Most Significant spurs, then going back to the processing of a new frame.

20. The method according to claim 19 wherein said first number of chips is equal to 500 chips and said second number of chips is equal to 800 chips.

21. The method according to claim 19 wherein up to four distinctive spurs or jammers are identified from said spectrum analysis.

* * * * *